Aug. 4, 1959  C. A. RAFFERTY  2,898,538
AUTOMATIC STEERING SYSTEM
Filed Feb. 2, 1954  2 Sheets-Sheet 1

*INVENTOR.*
CHRISTOPHER A. RAFFERTY
BY
Oscar B. Brumback
*ATTORNEY*

United States Patent Office 2,898,538
Patented Aug. 4, 1959

2,898,538

AUTOMATIC STEERING SYSTEM

Christopher A. Rafferty, Brooklyn, N.Y., assignor to Bendix Aviation Corporation, Teterboro, N.J., a corporation of Delaware Application February 2, 1954, Serial No. 407,775

6 Claims. (Cl. 318—489)

This invention relates generally to control systems and more particularly to systems for controlling the oscillations of a craft.

The desired flight path of an aircraft is a straight line. The actual flight path, however, is usually a sinusoidal curve whose characteristics depend upon the design of the craft. This results from the craft not responding instantly to control action because of various factors such as the time required for the change in distribution of pressure on different surfaces of the craft to reach the torque required to change the craft and the inertia involved in changing the movements of a high speed aircraft.

- Rate gyroscopes or rate taking networks have heretofore been used in automatic steering systems to reduce the amplitude of these oscillations. Rate gyros present the disadvantage, however, that a signal nulling circuit is required to cancel the signal developed by the gyro during a constant rate of turning. This involves the use of various electronic tubes and results in a complicated system whose marginal life depends upon the performance of the electronic tubes. Rate taking networks, on the other hand, utilize various electrical or pneumatic components to derive a signal that is proportional to the angular rate of oscillation from another signal that is proportional to the aircraft attitude. These networks are complicated and cumbersome.

An object of the present invention, therefore, is to provide a novel apparatus of compact and simple construction for damping the oscillation of an aircraft.

A still further object is to provide a novel apparatus for integrating the angular acceleration of a craft to provide a corresponding control signal.

Still another object is to provide a novel mechanical linkage for transmitting motion from a driving member to a driven member.

The novel steering system contemplated in the present invention utilizes a component which is responsive to angular acceleration and which in a steady or constant acceleration condition has responsive characteristics to oscillation frequencies such that a signal proportional to the angular velocity of the acceleration can be provided over any desired portion of the frequency spectrum; the device, thus, being effectively an integrating angular accelerometer since its output is proportional to angular rate of change. In the contemplated system, the band width of the velocity characteristic of the acceleration responsive component is made broad enough to include the model natural frequency of oscillation of the craft so as to supply artificial damping to the system for that particular mode of oscillation. Although its function here would be similar to that of a conventional rate gyro, it possesses distinct advantages over a rate gyro in at least two respects: namely, the need for a signal nulling circuit is obviated since its output is zero for a steady rate of turn of the craft, and where marginal performance of the automatic control system is caused by lags or by dead areas in boost servos, the stability may be increased by raising the natural frequency of the device whereby the ultimate phase lead of its output with respect to the cycle of oscillation may be advanced to one hundred eighty degrees. In contrast, a maximum shift of ninety degrees is available from a conventional rate gyro.

Other objects and advantages of the present invention will become apparent from the specification when taken in connection with the accompanying drawings wherein one embodiment of the invention is illustrated by way of example. It is to be expressly understood, however, that the drawings are for the purpose of illustration and description only, and are not to be construed as defining the limits of the invention.

Figure 2:
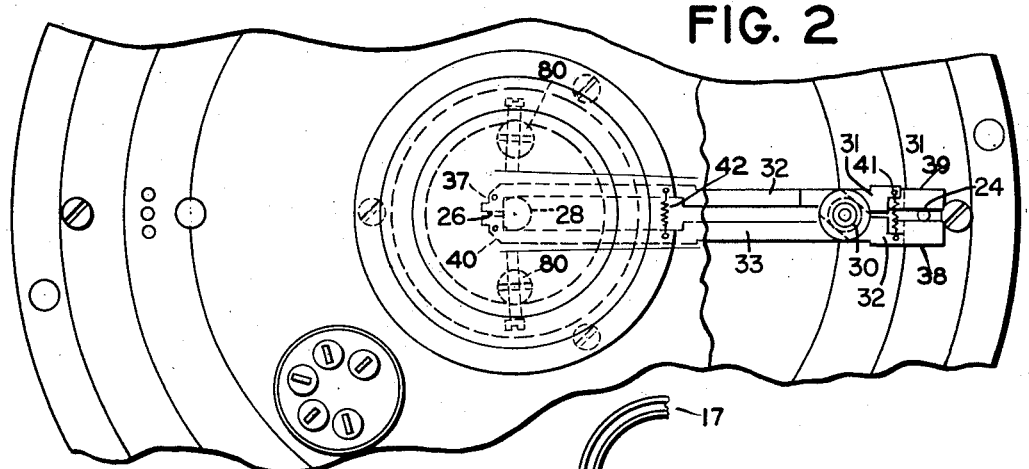
Fig. 2 is a plan view of a section along line 2—2 of Fig. 1.
Figure 1:
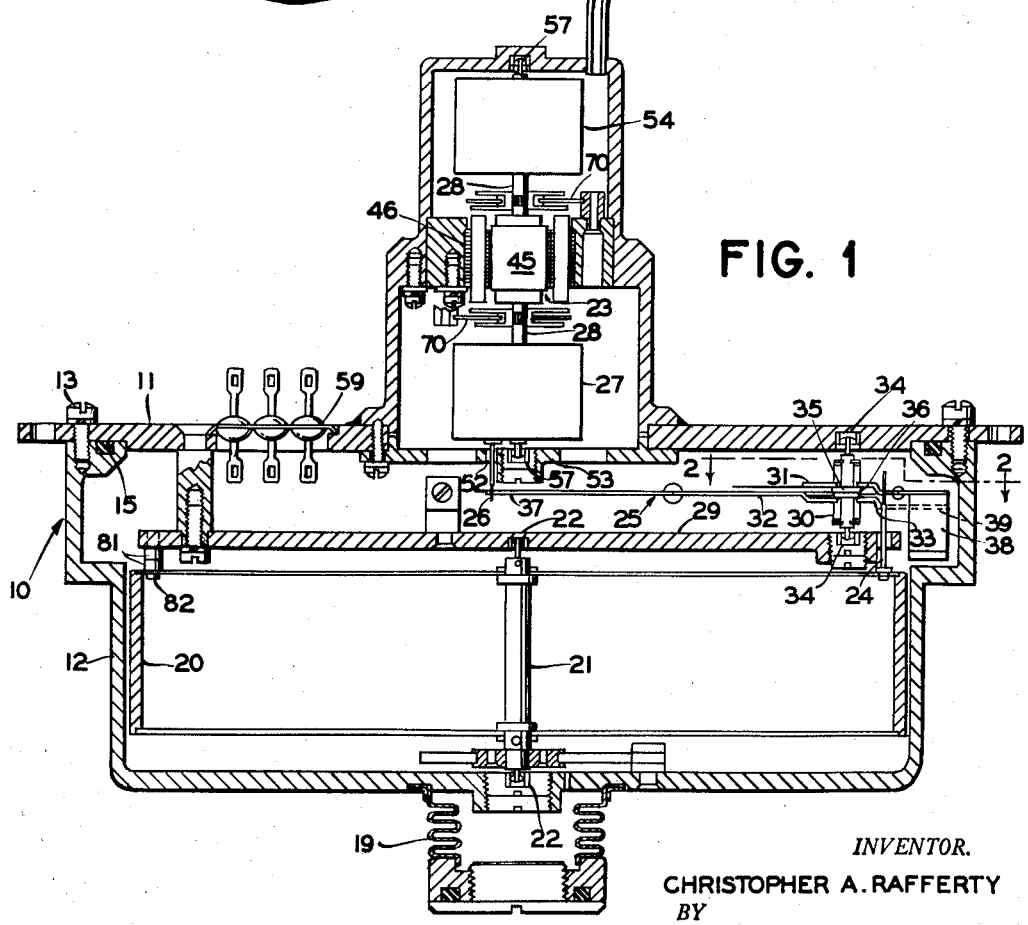
Fig. 1 is an elevational view in section of one embodiment of the novel integrating angular accelerometer.

Turning now to Figure 1 of the drawings, the novel accelerometer of the present invention is shown as having a case 10 constructed of two members 11 and 12 hermetically sealed as by bolts 13 and gasket 15. Case 10 is completely filled with a suitable fluid by way of a tube 17, and the tube is sealed. A conventional bellows assembly 19 is provided to permit volumetric expansion and contractions of the fluid with thermal changes. This fluid damps the accelerometer by eliminating the spurious acceleration so that only those accelerations which persist beyond very short intervals are measured.

The response to the acceleration is provided by a mass member 20 which may be a hollow cylinder with the greatest part of its mass concentrated at its periphery. The assembly, comprised of a shaft 21 and member 20 fixed to it, is journalled in suitable friction free bearings, such as cap and jewel bearings 22; and the assembly is statically balanced about its axis.

The response of inertia member 20 is transmitted to an inductive device 23 by way of a pin 24, a novel lever assembly 25, a pin 26, a float 27, and a shaft 28 to which inductive device 23 is keyed. Pin 24 is fixed to the periphery of member 20 and extends through a slot 28 in a plate 29 to engage the novel lever assembly 25 which correlates the position of a pin 26 with that of pin 24 with a minimum of back lash.

Lever assembly 25, Fig. 1, is comprised of a shaft 30 and three bars: upper bar 31, central bar 32, and lower bar 33. This shaft is journalled in plate 29 and housing 11 by suitable friction free bearings such as cap and jewel bearings 34.

Upper bar 31 and lower bar 33 are rotatably on shaft 30 and are spaced along the shaft by suitable means such as washers 35 and snap rings 36. Central bar 32, on the other hand, is fixed to shaft 30, and its end portions constitute jaws 37 and 38. A jaw 39 at the free end of bar 31 and a jaw 40 at the free end of bar 33 coact with the jaws at the ends of bar 32. A spring 41 urges jaws 38 and 39 to yieldingly clamp pin 24, and a spring 42 urges jaws 37 and 40 to yieldingly clamp pin 26 which controls the position of the rotor 45 of signal developing device 23 relative to stator 46. This pin 26 projects from float 27 through a slot 52 in plate 53 into engagement with jaws 37 and 40 of lever assembly 25.

Float 27, float 54 and rotor 45 are all fixed to shaft 28 to form an assemblage which is journalled in housing 11 and plate 53 by suitable friction free bearings, such as cap and jewel bearings 57. Floats 27 and 54 regulate the buoyancy of this assemblage in the damping fluid. Since bearings supporting these parts have a negligible constant loading, they serve only as guides and may be made small so as to obtain friction free operation and insure a high dynamic range for the accelerometer. The buoyancy also tends to prevent impacts and accelerations from damaging the sensitive mechanical connections.

Signal developing device 23 may be a conventional inductive device having a two-pole, single phase, wound rotor 45 inductively associated with stator 46 which is Y-connected and wound on a circular laminated metal core. An insulated terminal block 59 provides for the rotor and stator leads.

Since either the rotor or stator of inductive device 23 may be excited externally by a suitable alternating current source, it may be assumed for purposes of illustration that rotor 45 is externally excited and normally lies in a null position. In this position, the poles of the rotor are at right angles to the stator field; and, as long as rotor 45 remains in this position, no signal is indicated in the stator winding. Should the rotor be moved, however, it will no longer be in a null position and, an electrical signal or impulse can be obtained from the stator winding leads. Normally, the output of inductive device 23 is zero, the rotor being so arranged that its null position coincides with the torsional null of restoring hair springs 70. Also, stops 80 are provided on either side of this null position to coact with the lever assemblage 25 to limit the maximum rotation of rotor 45, and stops 81 on case 10 are provided to coact with stop 82 on inertia member 20 to prevent excessive angular displacement of the case and inertia member.

The novel integrating angular accelerometer operates as follows:

Angular accelerations are applied to casing 10 along the sensitive direction of the instrument, namely, perpendicular to the longitudinal axis of shaft 21. Although the action of hair springs 70 constrains member 20 to rotate along with case 10, the inertia resulting from the mass of member 20 compels it to lag slightly behind the rotation of case 10, and this develops an angle of displacement between inertia member 20 and its normal position relative to casing 10.

Pin 24 transmits the displacement of inertia member 20 relative to casing 10 to pin 26 by way of lever assembly 25. Since pin 26 is attached to float 27 which, together with rotor 45 and float 54, are fixed to shaft 28, any movement imparted to pin 26 is also imparted to rotor 45. This displacement of rotor 45 from its null position relative to the stator 46 which is fixed to case 10 results in the generation of a signal in either the rotor or the stator, depending upon which one is externally excited. In the case assumed above wherein the rotor was excited, the electrical impulse or signal derived from the stator leads would be proportional to the angular displacement between case 10 and inertia member 20.

As oscillations are applied to the accelerometer, the phase of the output signal leads the oscillation input by one hundred eighty degrees. This phase lead arises because the output is a measure of the acceleration and can be readily demonstrated by assuming that the oscillations applied to the casing 10 are such that the displacements of the casing from its normal position would, if plotted graphically, develop a curve having the general equation:

(1)     Displacement $= a$ sine $\omega t$

The rate of displacement then would be the first derivative of this equation or;

(2)     Rate of Displacement $= +a\omega$ cosine $\omega t$ and acceleration would then be the second derivative of Equation 1 or;

(3)     Acceleration $= -\omega^2$ sine $\omega t$

It can be seen by comparing Equations 1 and 3 that the signal representing the acceleration of the casing would be proportional in magnitude but opposite in sign to a signal representing the displacement of the casing. When alternating current signals were employed, this means the signals will have relatively corresponding amplitudes but opposite phases.

The present invention, however, is not an ordinary accelerometer; but is an integrating angular accelerometer since due to the action of the damping fluid, the output of the novel device presents an integration of the angular acceleration.

At zero oscillation frequency, when alternating current signals are employed, the output of the accelerometer will lead the input (which could be represented by displacement signal) by one hundred eighty degrees. As the frequency of oscillation is increased, however, the phase lead of the output of the accelerometer with respect to the phase of a theoretical displacement signal representing the input decreases. Thus, an oscillation frequency can be attained where the output from the accelerometer leads the displacement of the case 10 by ninety degrees. This particular frequency of oscillation is called the natural frequency of the integrating accelerometer. At very high frequencies, of course, the output is in phase with the input.

The accelerometer, at its natural frequency, integrates the angular response to a velocity or rate signal; this relationship mathematically:

$$-\int a\omega^2 \text{ sine } \omega t = +a\omega \text{ cosine } \omega t$$

It has been found that when the damping fluid damps the accelerometer to an extent of approximately ten times the critical damping, the range of oscillation frequencies over which an approximately ninety degree phase lead is developed by the accelerometer is quite large. For example, the phase lead may be one hundred degrees for oscillation frequencies that are one-fourth the natural frequency and may be eighty degrees for oscillation frequencies that are twice the natural frequency.

The foregoing analysis is made with the consideration that a steady state oscillation condition has been reached. At this time, the phase angle of the output of the accelerometer leads by ninety degrees the phase angle of a signal that would theoretically represent the displacement of the casing from its null position caused by the oscillation.

The novel integrating accelerometer is particularly useful for damping the oscillations of aircraft. For this purpose, the novel integrating accelerometer is adjusted by varying the stiffness of its null restoring hairspring until the natural frequency of oscillation of the accelerometer corresponds to the model frequency of oscillation of the aircraft. The signal developing device of the accelerometer is connected into the signal loop of the automatic pilot system of the craft where it can supply artificial damping for the craft's oscillation. As discussed above, when the accelerometer is damped approximately ten times the critical value, its output signal will lead the angular displacement resulting from the craft's oscillation by a phase of approximately ninety degrees despite the wide range of frequencies that may be encountered as a result of different flying conditions.

Figure 3:
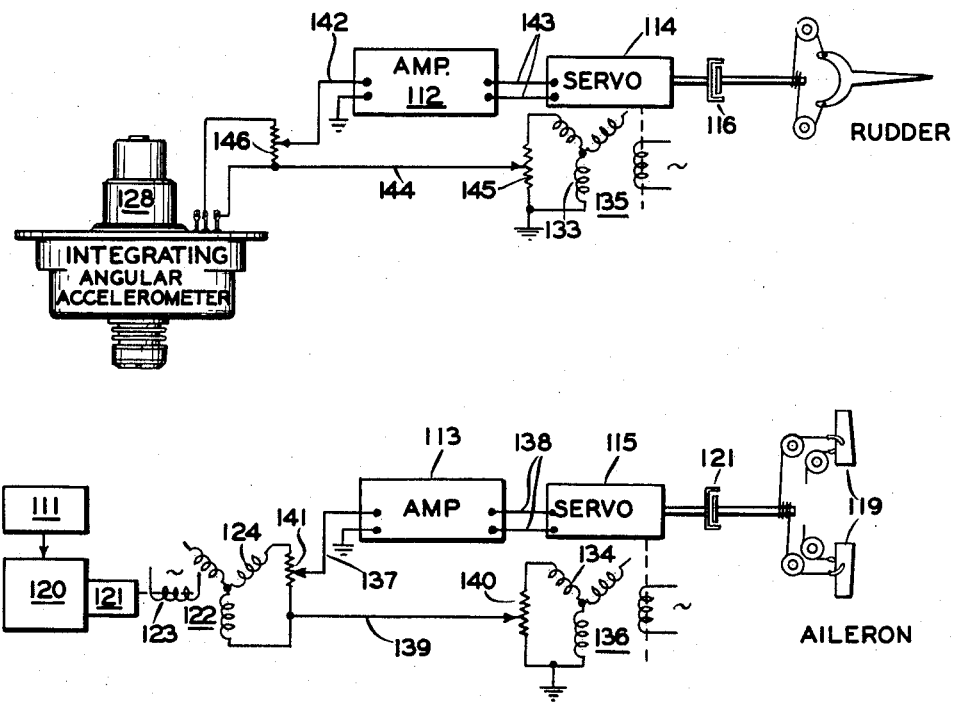
Fig. 3 is a schematic diagram of the novel integrating angular accelerometer of Figure 1 incorporated in an automatic pilot system.

The novel integrating accelerometer is disclosed in Fig. 3 in operative association with an automatic pliot. In the embodiment of the autopilot system herein, the directional displacement or heading signal developed by compass 111 is transmitted to a master direction indicator 120 where the signal energizes a motor which drives an inductive device to a null and displaces a pointer to indicate the heading change. A clutch 121 is provided between this motor and an inductive signal device 122 whose winding 123 is inductively coupled with a stator winding 124 connected in the signal loop of the automatic pilot. These units are more fully shown and described in U.S. Patent No. 2,625,348, issued January 13, 1953 to P. A. Noxon.

One end of stator 124 is connected by way of a lead 137 with the input of an aileron channel amplifier 113 whose output operates an aileron servomotor 115 by way of a cable 138. The other end of stator 124 is connected by way of a lead 139 with a resistor 140 mounted across wound stator 134, one end of the resistor being grounded as shown. A resistor 141 is also connected across leads 137 and 139 so that the displacement and follow-up signals measured as voltage drops across resistors 140 and 141 are connected in series. The algebraic summation of these signals are applied to amplifier 113.

In the operation of the foregoing arrangement, clutches 116 and 121 are engaged. The displacement signal developed by compass 111 and generated by inductive device 122 in response to a change in heading of the craft in one direction energizes servomotor 115 by way of amplifier 113 to displace aileron 119 to bank the craft in an opposite direction to return it to its initial heading. The operation of motor 115 also actuates follow-up device 136 to develop a follow-up signal to oppose the displacement signal. This follow-up signal gradually increases until it is equal to the displacement signal whereupon motor 115 is deenergized. As the craft returns to its initial heading, the displacement signal drops to zero and the follow-up signal prevails to reverse operation of motor 115 to return aileron surfaces 119 to a normal position where the follow-up signal drops to zero and the motor is again deenergized.

Should the craft bank about its roll axis, it will be caused to turn or change heading about its yaw axis in the direction of the bank. Change in heading will manifest itself by a signal at compass 111 which operates aileron servo 115 to reestablish the normal attitude of the craft and return it to its initial heading.

The above operation will tend to maintain a craft on course. However, the craft will not fly in a straight line, but, instead will oscillate about the desired course in sinusoidal fashion. In accordance with the present invention, the novel integrating angular accelerometer is placed in the signal chain to damp these oscillations.

One side of inductive device 23 of the novel integrating angular accelerometer 128 is connected by way of a lead 142 with the input of rudder channel amplifier 112 whose output is connected with rudder servomotor 114 by way of a cable 143. The other end of the inductive device 23 connects by way of a lead 144 with a resistor 145 mounted across stator 133 of follow-up device 135, one end of the resistor being grounded as shown. A resistor 146 is also connected across leads 142 and 144. Thus, the integrated acceleration and rudder follow-up signals, measured as voltage drops across resistors 145 and 146, are connected in series. The algebraic summation of signals is applied to rudder amplifier 112. When clutch 116 is engaged, motor 114 operates in response to an integrated angular acceleration signal developed at device 128 to displace rudder 18 and develop at follow-up device 135 a follow-up signal in opposition to the integrated acceleration signal. Both leads 139 and 144 may be provided with taps adjustable relative to resistors 140 and 145 for sensitivity adjustment purposes.

During a change in heading caused by the oscillation of the craft, the craft develops an angular acceleration to which the novel integrating angular accelerometer responds for the displacement of inductive device 23 of the accelerometer 128. Thus, a signal is generated in the stator proportional to the integral of such acceleration. As discussed above, this signal which is advanced ninety degrees with respect to the cycle of oscillation is applied to the rudder channel amplifier 112 which develops an output that energizes rudder servomotor 114 to displace rudder also operates follow-up device 135 to develop a follow-up signal opposing the acceleration signal of device 128. This follow-up signal gradually increases until it is equal to the acceleration signal whereupon motor 114 is deenergized, and the surface displaced. As craft change in heading stops, the acceleration signal drops to zero. The signal reverses as the craft returns to its initial heading, and aids the follow-up signal in hastening centralization of the rudder to damp the amplitude of the oscillation of the craft about its desired course. The operation of the rudder by the novel accelerometer in each case will anticipate the displacement of the craft by a quarter of a cycle.

The foregoing has presented a novel control system which anticipates the oscillation of an aircraft about its flight path so as to damp the amplitude of these oscillations. In order to do this, a novel integrating angular accelerometer is provided which operates in a fashion similar to a rate gyro to provide signals corresponding to angular velocity of the craft for oscillations at the model frequency of oscillation of craft. In contrast to the rate gyro, however, during a constant rate of turning of the craft this novel integrating accelerometer does not develop a signal and by suitable adjustment may have the phase of the output signal advanced as desired with respect to the oscillation cycle of the craft to compensate for any lags in the servosystem. Obviously, this greatly stabilizes the craft.

As many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

I claim:

1. An accelerometer comprising a support means, inertia means pivotally mounted on said support means, a two part electrical signal developing means, means for fixing one part to said support means, and means for moving the other part by said inertia means including a pivot rotatably mounted on said support means, a first bar having a jaw on each end and a portion intermediate said jaws fixed to said pivot, a second bar rotatably mounted on said pivot and having a jaw adapted to coact with one jaw of said first bar to form a first pair of cooperating jaws, a third bar rotatably mounted on said pivot and having a jaw adapted to coact with the other jaw of said first bar to form a second pair of cooperating jaws, means on said inertia means engageable by said first pair of coacting jaws, means on said other part of said signal device engageable by said second pair of coacting jaws, and resilient means associated with each pair of coacting jaws whereby the jaws yieldingly engage said engageable means.

2. In an accelerometer having an inertia member adapted to move one part of a two part signal developing device relative to the other, a rotatable member, a first bar having a jaw on each end and a portion intermediate its ends fixed to said member, a second bar rotatable on said member and having a jaw adapted to coact with one jaw of said first bar to form a first pair of coacting jaws, a third bar rotatable on said member and having a jaw adapted to coact with the other jaw of said first bar to form a second pair of coacting jaws, means on said inertia member engageable by said first pair of said coacting jaws, means on said one part of said signal developing device engageable by said second pair of coacting jaws, and resilient means associated with each pair of jaws for yieldingly engaging said jaws with said engageable means.

3. A device for driving one element by another element, comprising a rotatable support, a first member having two diametrically opposed jaws and a portion intermediate its jaws fixed to said support, a second member rotatable on said support and having a jaw adapted to coact with one jaw of said first member to form a first pair of coacting jaws, a third member rotatable on said support and having a jaw adapted to coact with the other jaw of said first member to form a second pair of coacting jaws, means on said one element engageable by said first pair of coacting jaws, means on said other element engageable by said second pair of coacting jaws, and resilient means associated with each pair of jaws for yieldingly engaging said jaws with said engageable means.

4. In an automatic steering system for a craft having a movable control surface, a servomotor for moving said surface, and control means for developing a signal for operating said servomotor, said control means comprising support means, inertia means pivotally mounted on said support means, a two part electrical signal developing means for developing a signal upon relative movement of said parts, means for fixing one of said parts to said support means, and means for moving the other of said parts by said inertia means including a pivot rotatably mounted on said support means, a first bar having a jaw at each end and a portion intermediate said jaws fixed to said pivot, a second bar rotatably mounted on said pivot and having a jaw adapted to coact with one of said jaws of said first bar to form a first pair of cooperating jaws, a third bar rotatably mounted on said pivot and having a jaw adapted to coact with the other of said jaws of said first bar to form a second pair of cooperating jaws, means on said inertia means engageable by said first pair of coacting jaws, means on said second part of said signal device engageable by said second pair of coacting jaws, and resilient means associated with each pair of coacting jaws so that the jaws yieldingly engage said engageable means, whereby relative movement of said support and inertia means causes relative movement of the two parts of said signal developing means.

5. In an automatic steering system for a craft having a movable control surface, a servomotor for moving said surface, and control means for developing a signal for operating said servomotor, said control means comprising a two part electrical signal developing device, an inertia member, connecting means connecting said inertia member and said signal device to move one part of said signal device relative to the other to develop a corresponding signal, said connecting means including a rotatable member, a first bar having a jaw on each end and a portion intermediate its ends fixed to said member, a second bar rotatable on said member and having a jaw adapted to coact with one jaw of said first bar to form a first pair of coacting jaws, a third bar rotatable on said member and having a jaw adapted to coact with the other jaw of said first bar to form a second pair of coacting jaws, first means on said inertia member engageable by said first pair of coacting jaws, second means on said one part of said signal developing device engageable by said second pair of coacting jaws, and resilient means associated with each pair of jaws for yieldingly engaging said first and second pairs of coacting jaws with said first and second engageable means respectively.

6. In an automatic steering system for a craft having a movable control surface, a servomotor for moving said surface, and control means for developing a signal for operating said servomotor, said control means comprising a support, an inertia means pivotally mounted on said support, a first member having two diametrically opposed jaws and a portion intermediate its jaws rotatable on said support, a second member rotatable on said support and having a jaw adapted to coact with one jaw of said first member to form a first pair of coacting jaws, a third member rotatable on said support and having a jaw adapted to coact with the other jaw of said first member to form a second pair of coacting jaws, a signal device having two elements relatively displaceable to develop a control signal, means on one of said elements engageable by said first pair of coacting jaws, means on the inertia means engageable by said second pair of coacting jaws, and resilient means associated with each pair of jaws for yieldingly engaging said jaws with said engageable means, and said members responsive to said inertia means for moving said one element relative to the other of said elements for developing the control signal.

References Cited in the file of this patent

UNITED STATES PATENTS

| | | |
|---|---|---|
| 2,431,706 | Nisbet | Dec. 2, 1947 |
| 2,498,118 | Weiss | Feb. 21, 1950 |
| 2,595,868 | Milsom | May 6, 1952 |
| 2,603,726 | McLean | July 15, 1952 |
| 2,618,159 | Johnson et al. | Nov. 18, 1952 |
| 2,620,463 | Meredith | Dec. 2, 1952 |
| 2,643,869 | Clark | June 30, 1953 |
| 2,672,334 | Chenery | Mar. 16, 1954 |
| 2,759,689 | Owen | Aug. 21, 1956 |
| 2,802,956 | Jarosh et al. | Aug. 13, 1957 |